United States Patent [19]

Eichenauer et al.

[11] Patent Number: 4,612,347

[45] Date of Patent: Sep. 16, 1986

[54] POLYMER MIXTURES WITH A MAT SURFACE

[75] Inventors: Herbert Eichenauer, Dormagen; Joachim Döring, Cologne; Karl-Heinz Ott, Leverkusen; Ludwig Bottenbruch, Krefeld, all of Fed. Rep. of Germany

[73] Assignee: Bayer Aktiengesellschaft, Leverkusen, Fed. Rep. of Germany

[21] Appl. No.: 698,781

[22] Filed: Feb. 6, 1985

[30] Foreign Application Priority Data

Feb. 18, 1984 [DE] Fed. Rep. of Germany ....... 3405938

[51] Int. Cl.$^4$ ...................... C08L 39/08; C08L 51/04
[52] U.S. Cl. ........................................ 525/73; 525/72; 525/75; 525/77; 525/78; 525/80

[58] Field of Search .................. 525/73, 77, 78, 75, 525/72, 80

[56] References Cited

U.S. PATENT DOCUMENTS 3,849,172 11/1974 Chin et al. ............................ 525/73
4,504,625 3/1985 Kitsunai et al. .

FOREIGN PATENT DOCUMENTS 2518105 6/1983 France .

Primary Examiner—Jacob Ziegler
Attorney, Agent, or Firm—Connolly and Hutz

[57] ABSTRACT

The invention relates to polymer mixtures with a mat surface, based on graft polymers with acid functions and thermoplastic resins with basic functions.

10 Claims, No Drawings

POLYMER MIXTURES WITH A MAT SURFACE

The invention relates to polymer mixtures with a mat surface, based on graft polymers with acid functions and thermoplastic resins with basic functions.

Polymer blends with elastic-thermoplastic properties and a mat surface are of increasing interest for fields of application where high toughness and at the same time low gloss is required, thus, for example, for components in automobile interiors or for equipment coverings.

Attempts have hitherto been made to prepare such polymer blends by using large rubber particles (compare, for example, U.S. Pat. No. 4,169,869) or using rubbers which are not crosslinked or only slightly crosslinked (compare, for example, DE-OS (German Published Specification No. 2,057,936), as the graft base for the graft polymers.

However, in all these attempts the desired nature of the surface is acquired with the loss of product qualities which are similarly desirable, such as, for example, notched impact strength, hardness or processability.

The invention relates to mat polymer mixtures of (A) 99.95 to 0.05% by weight, preferably 85 to 15% by weight, of a graft product of a mixture of 40 to 99.9 parts by weight of styrene, α-methylstyrene, p-methylstyrene, vinyltoluene, methyl methacrylate or mixtures thereof, 40 to 0.1 parts by weight of a monoacid or diacid containing a polymerisable double bond and 0 to 49 parts by weight of acrylonitrile on a rubber in particle form with an average particle diameter ($d_{50}$) of 0.05 to 20.0 μm and a glass transition temperature of $\leq 10°$ C., with a total rubber content of 5 to 80% by weight, and (B) 0.05 to 99.95% by weight, preferably 15 to 85% by weight, of a thermoplastic resin containing 0.1 to 40% by weight of incorporated units of a basic monomer containing vinyl groups.

Virtually all the rubbers with glass transition temperatures of $\leq 10°$ C. can be used as the graft base for the graft product (A). Examples are polybutadiene, polyisoprene, styrene/butadiene copolymers, acrylonitrile/butadiene copolymers, acrylate rubbers, EPM rubbers (ethylene/propylene rubbers) and EPDM rubbers (ethylene/propylene/diene rubbers which contain small amounts of a nonconjugated diene, such as, for example, hexa-1,5-diene or norbornadiene, as the diene).

These rubbers must be in the form of particles with an average diameter ($d_{50}$) of 0.05 to 20.0 μm, preferably 0.1 to 2.0 μm and particularly preferably 0.1 to 0.8 μm.

The graft product (A) is prepared in a manner which is known per se by grafting polymerisation in emulsion, suspension or solution or by a combination of these processes.

It contains 5 to 80% by weight of rubber, in particular 20 to 60% by weight, and has a gel content, measured in acetone at 25° C., of 30 to 90% by weight, in particular 40 to 80% by weight.

Examples of suitable grafting monomers are styrene, α-methylstyrene, p-methylstyrene, vinyltoluene, acrylonitrile, methacrylonitrile, methyl methacrylate, vinylacetate or mixtures thereof, in particular mixtures of acrylonitrile with styrene.

The graft product (A) is prepared by polymerisation of these monomers in the presence of the diene or acrylate rubbers, a polymerisable monoacid or diacid, for example acrylic acid, methacrylic acid, maleic acid, fumaric acid, itaconic acid, crotonic acid, cinnamic acid, vinylsulphonic acid, vinylbenzenesulphonic acid or mixtures thereof, being required as further monomer components, aliphatic $C_3$-$C_{10}$-or aromatic $C_9$-$C_{18}$-mono- or di-carboxylic acids being pre- ferred.

Examples of monomer components which are suitable for building up the thermoplastic resin (B) are styrene, αmethylstyrene, p-methylstyrene, vinyltoluene, acrylonitrile, methacrylonitrile, methyl methacrylate, vinyl acetate, N-phenylmaleimide and mixtures thereof, in particular mixtures of acrylonitrile and styrene.

The thermoplastic resin (B) is preferably prepared by polymerisation of these monomers in emulsion, suspension or solution in a manner which is known per se, a basic compound containing vinyl groups (for example 2-vinylpyridine, 3-vinylpyridine, 4-vinylpyridine, N-vinylimidazole, p-dimethylaminostyrene, 4-vinylpyrimidine, N-vinylcarbazole, N-vinylpyrrole, N-vinylindole, dimethylaminoethyl methacrylate or mixtures thereof), being required as a further monomer component.

In the preparation of the graft product (A) and the thermoplastic resin (B) by emulsion polymerisation, it is necessary to take into consideration the acid or basic monomer when choosing the emulsifiers. If acid monomers are present, the polymerisation must be carried out in an acid medium, and thus using emulsifiers which are still effective at pH values below 7. Care must also be taken during working up, that is to say during precipitation of the latices, that the acid or basic character of the graft polymers is retained.

The polymer blends according to the invention can be obtained by mixing their constituents (A) and (B) with one another at elevated temperatures, in particular at temperatures of 100° C. to 280° C., for example in kneaders or on roll mills or screw machines. If (A) and (B) are obtained as dispersions, suspensions or solutions, these can be mixed and worked up together.

The customary amounts of the usual additives, such as antioxidants, anti-ageing agents, lubricants, flameproofing agents, fillers, pigments and antistatics, can be added to the blends.

The blends according to the invention are mat, flexible, thermoplastic moulding materials with good flow properties during processing by extrusion, calendering and injection moulding. They can be processed to mat moulded articles, but are also suitable as modifiers for other plastics, in particular for thermoplastics, such as acrylonitrile/butadiene/styrene terpolymers (ABS), methyl methacrylate/butadiene/styrene terpolymers (MBS), styrene/acrylonitrile copolymers (SAN), α-methylstyrene/acrylonitrile copolymers, polystyrene, h:gh impact polystyrene (HIPS), polymethyl methacrylate, polyvinyl chloride, polycarbonate, polycarbonate/ABS mixtures, polyphenylene oxide, polyphenylene oxide/HIPS mixtures, polyamides, for example polyamide 6 and polyamide 66, and polyesters, for example polyethylene terephthalate and polybutylene terephthalate. Those mixtures according to the invention which contain a large amount of rubber—about 50 to 70%—are preferably used as "matting modifiers". Their amount is in general 5 to 40% by weight, based on the total modified product.

EXAMPLES AND COMPARISON EXAMPLES

The following examples illustrate the invention. Parts are parts by weight and always relate to the solid constituents or polymerisable constituents.

Preparation of the graft products

G parts of rubber base (in the form of a latex with a solids content of between 35 and 50% by weight) are warmed to 65° C. in a reactor, after which 0.5 part of potassium persulphate (dissolved in 20 parts of water) is added. M parts of the monomer mixture stated in Table 1 and 2 parts of the sodium salt of $C_9$-$C_{18}$ -alkylsulphonic acids, as an emulsifier (dissolved in 25 parts of water), are then metered in over a period of 4 hours, during which the grafting reaction takes place. After an after-reaction time, the graft latex is coagulated, after addition of 1.2 parts of antioxidant, in an aqueous magnesium sulphate/acetic acid solution. The resulting powder is washed with water, an acid solution and again with water and dried at 70° C. in vacuo.

TABLE 1

| | Composition of the graft products | | | | |
|---|---|---|---|---|---|
| Graft product | Rubber base | Average particle size (diameter) | G (parts) | Monomer (parts by weight) | M (parts) |
| 1 (comparison) | polybutadiene latex | 0.4 μm | 50 | 72 styrene 28 acrylonitrile | 50 |
| 2 (comparison) | polybutyl acrylate latex | 0.5 μm | 50 | 72 styrene 28 acrylonitrile | 50 |
| 3 | polybutadiene latex | 0.4 μm | 50 | 65 styrene 25 acrylonitrile 10 methacrylic acid | 50 |
| 4 | polybutadiene latex | 0.4 μm | 60 | 55 styrene 15 acrylonitrile 10 methyl methacrylate 20 acrylic acid | 40 |
| 5 | polybutyl acrylate latex | 0.5 μm | 50 | 61 styrene 24 acrylonitrile 15 methacrylic acid | 50 |

Preparation of the thermoplastic resins 250 parts of water, 2 parts of the sodium salt of disproportionated abietic acid, as the emulsifier, and 0.3 part of potassium sulphate are warmed to 65° C. in a reactor, after which 100 parts of the monomer mixture stated in Table 2 and the amount of tert.-dodecylmercaptan required to establish an average molecular (Mw) of about 80,000 to 90,000 are metered in over a perid of 4 hours. After an after-reaction time, the latex is coagulated, after addition of 1.2 parts of autioxidant, in an aqueous magnesium sulphate/acetic solution. The resulting powder is washed with water, a basic solution and again with water and dried at 70° C. in vacuo.

TABLE 2

| Composition of the thermoplastic resins | |
|---|---|
| Thermoplastic resin | Monomer (parts by weight) |
| 1 (comparison) | 72 styrene 28 acrylonitrile |
| 2 | 68 styrene 27 acrylonitrile 5 2-vinylpyridine |
| 3 | 65 styrene 25 acrylonitrile 10 2-vinylpyridine |
| 4 | 55 styrene 15 acrylonitrile 10 methyl methacrylate 20 N—vinylimidazole |
| 5 | 66 α-methylstyrene 29 acrylonitrile 5 2-vinylpyridine |

Preparation and testing of the moulding materials

P parts of the graft product (A) and H parts of the thermoplastic resin (B) are mixed with 3 parts of a lubricant in a kneader and the mixture is then injection-moulded to a small standard bars, a sheet (for evaluation of the surface) and a helix (for evaluation of the flow distance). Some of the material was processed to sheets by extrusion. The notched impact strength was measured at room temperature ($a_k{}^{RT}$) and at −40° C. ($a_k{}^{-40°\ C.}$) in accordance with DIN 53 453 (units: kJ/m$^2$), the ball indentation hardness ($H_c$) was measured in accordance with DIN 53 456 (units: N/mm$^2$), the heat distortion point (Vicat B) was measured in accordance with DIN 53 460 (units: ° C.) and the flow distance was measured at 220° C. on a helix about 8 mm wide and about 2 mm thick (units: cm). The gloss was measured in accordance with DIN 67 530 on a flat sheet with a reflecting angle of 60° (reflectometer value), with the aid of a "Multi-Gloss" multi-angle reflectometer from Byk-Mallinckrodt (see Table 3).

TABLE 3

| Compositions and test data of the moulding materials | | | | | | | | | | | |
|---|---|---|---|---|---|---|---|---|---|---|---|
| Moulding material | Graft product | P (parts) | Thermoplastic resin | H (parts) | $a_k$ RT | −40° C. $a_k$ | $H_c$ | Vicat B | Flow distance | Reflectometer value | Appearance of the extruded sheet |
| 1 (comparison) | 1 | 40 | 1 | 60 | 16 | 11 | 86 | 97 | 41 | 78 | glossy |
| 2 (comparison) | 1 | 40 | 3 | 60 | 14 | 12 | 81 | 94 | 42 | 76 | glossy |
| 3 (comparison) | 2 | 40 | 1 | 60 | 15 | 5 | 85 | 95 | 40 | 80 | glossy |
| 4 (comparison) | 3 | 40 | 1 | 60 | 12 | 7 | 87 | 98 | 34 | 25 | mat |
| 5 | 3 | 40 | 2 | 60 | 15 | 10 | 89 | 100 | 39 | 17 | mat |
| 6 | 3 | 25 | 3 | 75 | 10 | 5 | 92 | 101 | 40 | 12 | mat |
| 7 | 3 | 30 | 5 | 70 | 11.5 | 5 | 91 | 107 | 33 | 16 | mat |
| 8 | 4 | 40 | 4 | 60 | 14 | 8 | 91 | 100 | 37 | 8 | mat |

TABLE 3-continued

| | | | | | | | | | | Appearance |
| | | | Thermo- | | | | | | Reflecto- | of the |
| Moulding | Graft | P | plastic | H | −40° C. | | | Flow | meter | extruded |
| material | product | (parts) | resin | (parts) | $a_k$ RT | $a_k$ | $H_c$ | Vicat B | distance | value | sheet |
| --- | --- | --- | --- | --- | --- | --- | --- | --- | --- | --- | --- |
| 9 | 5 | 40 | 3 | 60 | 14 | 5 | 87 | 97 | 39 | 21 | mat |

As can be seen from Table 3, only a mixture of graft products with copolymerised acid monomer components and thermoplastic resins with incorporated basic monomers leads to uniformly mat surfaces, both by injection moulding and by extrusion processing, without an adverse influence on the other properties. In addition, an improved heat distortion point and a greater hardness (moulding materials 5 to 9) are thereby achieved. A mixture with a thermoplastic resin modified by basic monomers with an unmodified graft product leads to high-gloss mouldings (moulding materials 1 to 3), and although a mixture of a graft product modified by acid monomers with an unmodified thermoplastic resin also gives a mat surface, reduced flow properties and a decrease in the notched impact strength occur at the same time (moulding material 4).

We claim:

1. A mixture of
(A) 99.5 to 0.05% by weight of a graft product which is a mixture of 40 to 99.9 parts by weight of styrene, α-methylstyrene, p-methylstyrene, vinyltoluene, methyl methacrylate or mixtures thereof, 40 to 0.1 parts by weight of a monoacid or diacid containing a polymerisable double bond and 0 to 49 parts by weight of acrylonitrile grafted on a rubber in particle form with an average particle diameter ($d_{50}$) of 0.05 to 20.0 μm and a glass transition temperature of $\leq 10°$ C., with a total rubber content of 5 to 80% by weight, and
(B) 0.05 to 99.95% by weight of a thermoplastic resin containing 0.1 to 40% by weight of incorporated units of a basic monomer containing vinyl groups.

2. A mixture according to claim 1, in which the graft product of component (A) is present in an amount of 85 to 15% by weight and the thermoplastic resin of component (B) is present in an amount of 15 to 85% by weight.

3. A mixture according to claim 2, in which the graft product of component (B) is present in an amount of 80 to 20% by weight and the thermoplastic resin of component (B) is present in an amount of 20 to 80% by weight.

4. A mixture according to any of claims 1 or 2 or 3, in which the average particle diameter ($d_{50}$) of the rubber in particle form is 0.1 to 0.8 μm.

5. A mixture according to any of claims 1 or 2 or 3, in which the total rubber content in component (A) is 20 to 60% by weight.

6. A mixture according to claim 2 or 3, in which the graft product of component (A) is a mixture of 60 to 85 parts by weight of styrene, α-methylstyrene, p-methylstyrene, vinyltoluene, methyl methacrylate or mixtures thereof, 30 to 5 parts by weight of a monoacid or diacid containing a polymerisable double bond and 10 to 40 parts by weight of acrylonitrile on a rubber in particle form with an average particle diameter ($d_{50}$) of 0.1 to 1.0 μm; and a glass transition temperature of $\leq 10°$ C., with a total rubber content of 30 to 70% by weight, and the thermoplastic resin of component (B) consists of 60 to 89 parts by weight of styrene, α-methylstyrene, p-methylstyrene, vinyltoluene, methyl methacrylate, N-phenylmaleimide or mixtures thereof, 30 to 1 parts by weight of a basic nitrogen compound containing vinyl groups and 10 and 40 parts by weight of acrylonitrile.

7. A mixture according to claim 6 in which the nitrogen compound (B) is a heterocyclic nitrogen compound containing vinyl groups.

8. A mixture according to claim 7, in which the nitrogen compound is 2-vinylpyridine, 4-vinylpyridine or a mixture thereof.

9. A mixture according to claim 1 in which the mono- or diacid of component (A) is aliphatic monocarboxylic acid having 3 to 10 carbon atoms, aliphatic dicarboxylic acid having 3 to 10 carbon atoms, aromatic monocarboxylic acid having 9 to 18 carbon atoms, or aromatic dicarboxylic acid having 9 to 18 carbon atoms.

10. A mixture according to claim 9 in which the mono- or diacid of component (A) is acrylic acid, methacrylic acid or a mixture thereof.

* * * * *